United States Patent [19]

Sonoyama et al.

[11] Patent Number: 5,501,058
[45] Date of Patent: Mar. 26, 1996

[54] COIL PACKING LINE EQUIPPED WITH INDEPENDENTLY RECIPROCATING CARRIAGES

[75] Inventors: Mitsuyoshi Sonoyama; Kentaro Suzaki; Masaki Aihara, all of Chiba; Hirokatsu Suzuki, Tokyo; Shoji Miyahara; Norio Kojima, both of Saitama; Masatoshi Okada, Chiba, all of Japan

[73] Assignees: Kawasaki Steel Corporation, Hyogo; Tsubakimoto Chain Co., Osaka, both of Japan

[21] Appl. No.: 297,912

[22] Filed: Aug. 31, 1994

[30] Foreign Application Priority Data

Aug. 31, 1993 [JP] Japan .................................. 5-216728

[51] Int. Cl.$^6$ ...................................................... B65B 35/10
[52] U.S. Cl. ........................ 53/204; 53/211; 53/409
[58] Field of Search ........................... 53/204, 409, 210, 53/211, 214, 136.2, 461

[56] References Cited

U.S. PATENT DOCUMENTS

| | | | |
|---|---|---|---|
| 3,750,364 | 8/1973 | Miura | 53/409 |
| 4,485,612 | 12/1984 | Piesen et al. | 53/136.2 X |
| 4,498,276 | 2/1985 | Reed | 53/204 X |
| 4,524,562 | 6/1985 | Yagi et al. | 53/409 |
| 4,651,500 | 3/1987 | Chaffey | 53/228 X |
| 5,282,347 | 2/1994 | Cleine et al. | 53/204 |

*Primary Examiner*—James F. Coan
*Attorney, Agent, or Firm*—Staas & Halsey

[57] ABSTRACT

A coil packing line in which coils are packed by a plurality of operation processes is provided. The coil packing line is provided with a plurality of work stations, stationary skid mechanisms, carriage mechanisms and a plurality of reciprocating mechanisms. Each operation process has a corresponding work station. The stationary skid mechanisms are provided at each work station for supporting a coil at the work station. The carriage mechanisms are provided between each work station for removing a coil from an upstream stationary skid mechanism, supporting the coil and depositing the coil at a downstream stationary skid mechanism. The plurality of reciprocating mechanisms independently move at least one carriage mechanism back and forth between the upstream and downstream stationary skid mechanisms.

5 Claims, 5 Drawing Sheets

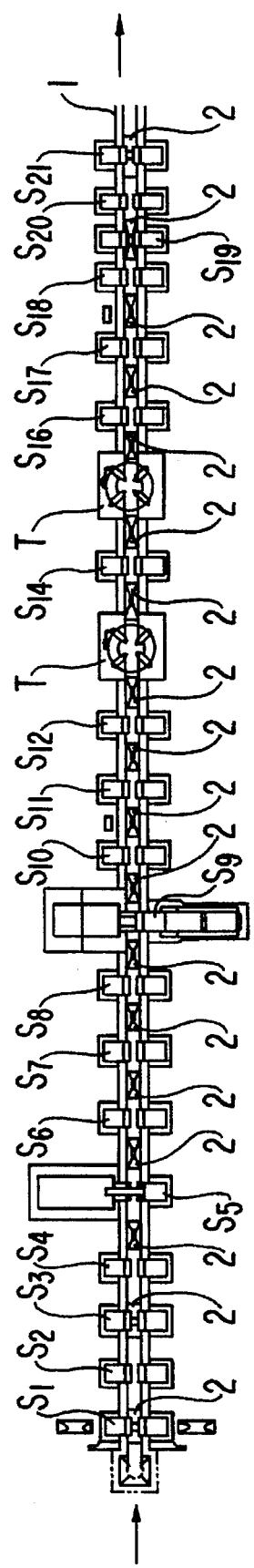
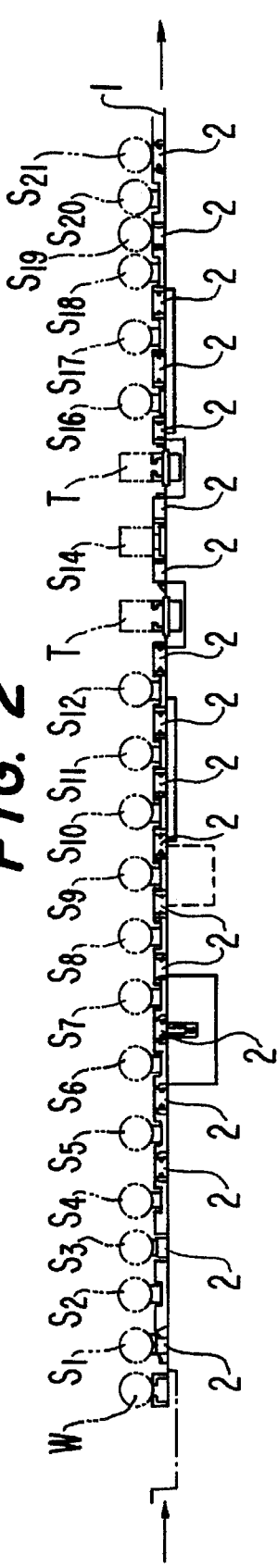

COIL PACKING LINE EQUIPPED WITH INDEPENDENTLY RECIPROCATING CARRIAGES

BACKGROUND OF THE INVENTION

1. Field of the Invention

The present invention relates in general to a coil packing line for packing coils, such as coiled steel, and, more particularly, to a coil packing line in which coils are moved within the coil packing line using reciprocating carriages having a hoisting and lowering mechanism, thereby overcoming the problems in the conventional coil packing lines of the chain conveyor type, etc.

2. Description of the Related Art

Sheet metal products obtained by rolling are generally wound into metal coils (hereinafter simply referred to as "coils"), which are packed in packing material for shipment.

The coil packing line for packing these coils uses a chain conveyor or a walking beam as the equipment for conveying the packed coils, all the coils in the line being conveyed simultaneously at a fixed pitch (distance from one another).

Japanese Utility Model Laid-Open No. 56-162217 discloses conventional chain conveyor type coil conveying equipment, which equipment is shown in FIGS. 8 and 9. In this conventional equipment, a number of saddles 51, which are arranged at a fixed pitch, are conveyed by a chain conveyor 50, with each saddle supporting a coil W to be conveyed.

However, such a conventional coil packing line using a chain conveyor or a walking beam, which simultaneously conveys a number of coils at a fixed pitch, has the following problems.

Firstly, due to the large installation space for the packing line, a large floor space is required. Also, the return side of the line is below the surface of the floor, so that a deep foundation is required, resulting in a high foundation construction cost.

Secondly, the conveyance of coils cannot be started until the packing processes for all the coils in the packing line have been completed, so that the expensive automatic packing machinery provided in the line works at a rather poor rate of operation, i.e., spends more time than optimal in a non-operational state.

Thirdly, due to structural limitations, the distance between adjacent coils being conveyed is fixed. Therefore, even if the optimum distance between adjacent stages (and thus adjacent coils) is known, it is necessary in reality to choose a distance which is approximately an integral multiple of the various optimum distances (conveyance pitches) and which is larger than that optimum distance between any two adjacent stages. Thus, the length of the entire packing line becomes excessively large, resulting in a high construction cost.

To solve the above problems, Japanese Patent Laid-Open No. 2-286510 proposes an apparatus in which the conveyance between the processing stages is performed by carriage-type conveyors.

In the apparatus disclosed in the above-mentioned publication, a plurality of carriages are linked together and are moved simultaneously. The forward and return passages of the packing line are connected by a traverser. That is, each carriage is conveyed from the end of the forward passage by the traverser to the return passage. The return passage is linked to the forward passage, and thus the carriages circulate through the system.

The above-described conventional apparatus of Japanese Patent Laid-Open No. 2-286510 has a problem in that the traverser equipment connecting the forward and return passages is provided separately from the return passage, resulting in a high equipment cost. Further, the above-discussed second and third problems are still present.

SUMMARY OF THE INVENTION

An object of the present invention is to shorten, as much as possible, the conveying distance of the entire packing line and the distance between two adjacent stages.

Another object of the present invention is to use the same conveyance route for the forward and return passages.

A further object of the present invention is to convey coils in such a way that the operation at each stage can be performed independently.

To achieve the above objects, in accordance with the present invention, there is provided an automatic coil packing line equipped with carriages having a hoisting and lowering mechanism. In the coil packing line, coils are packed in a plurality of operation stages. The coil packing line comprises: stationary skids which are provided at work stations of the various operation process stages, for the purpose of temporarily setting the coils thereon; additional stationary skids and coil turners which are provided between the work stations as needed; and reciprocating carriages, each having a hoisting and lowering mechanism, provided between the stationary skids or coil turners.

BRIEF DESCRIPTION OF THE DRAWINGS

Other means for solving the above problems and advantages of the present application will become more readily apparent from the following specification and claims, with reference to the accompanying drawings, in which:

FIG. 1 is a plan layout diagram showing a coil packing line according to an embodiment of the present invention which uses reciprocating carriages having a hoisting and lowering mechanism;

FIG. 2 is a side view of the line of FIG. 1;

DETAILED DESCRIPTION OF THE PREFERRED EMBODIMENTS

Figure 3:
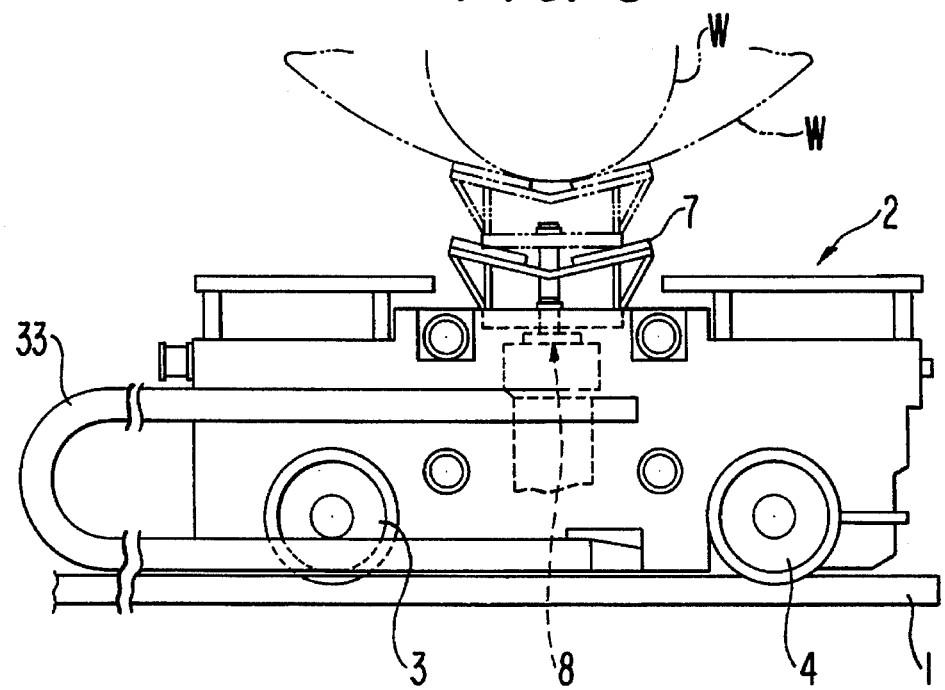
FIG. 3 is a side view of the reciprocating carriage and track of FIG. 1.

In accordance with the present invention, the conveyance of coils between the work stations of the processing stages within the coil packing line is conducted by reciprocating carriages, which by definition need no return passage. Therefore, there is no need to dig a deep hole in the floor to provide a route for the return passage. Thus, a substantial reduction in the foundation construction cost is achieved.

Further, stationary skids for supporting the coils at the work stations are provided, and a reciprocating carriage is arranged between each two adjacent stationary skids. Therefore, the conveyance of coils between each two adjacent stationary skids is conducted independently of the activity at other stationary skids by the carriage. In this manner, coils can be conveyed from one stage to the next stage as soon as the work at the first stage is completed. It is not necessary to wait for the completion of the processing at each stage of the packing line, thereby improving the rate of operation of the automatic packing machines and, at the same time, providing a closing-ahead and closing-back function for the coils.

Moreover, the traveling distance of each carriage can be freely set in accordance with the optimum distance between the relevant adjacent stages. It is thereby possible to minimize the entire length of the coil packing line and attain a reduction in the construction cost of the packing line due to reduced costs in the building housing the packing line, wiring, piping, etc.

Further, since the stop position at the station skid is set independently for each carriage, precise positional control of the conveyance is enabled. However, in the previous packing lines, extensive alignment is necessary to ensure that, at a given conveyor position, each coil will simultaneously reach its desired operation stage.

Additionally, even if the operation of one stage is interrupted for the purpose of, for example, supplying a particular packaging material to the automatic packing equipment, the operations at the other stages can continue without interruption. Further, the operating speed between stages can be arbitrarily determined by the operators of the stages. Thus, an ergonomically designed working environment is realized, thereby reducing mental pressure on the operators throughout the packing line.

The present invention will now be described with reference to the drawings, which show an embodiment of the present invention.

FIGS. 1 and 2 show a coil packing line, in which an unpacked coil W is first wrapped in wrapping paper and then a strap is wound around the coil to tie it. A label is then affixed to the surface of the coil, and, further, a QA (quality assurance) belt is glued to the coil so as to protect its outer peripheral surface from damage when a number of coils are piled one upon the other. These processing steps are automatically performed in succession.

In this coil packing line, stationary skids $S_1$–$S_{12}$, $S_{14}$ and $S_{16}$–$S_{21}$, for temporarily supporting coils W, are provided at the work stations of the processing steps and at coil delivery stations which are provided as needed. The processing steps of the coil packing line which occur at these various stationary skids $S_1$–$S_{12}$, $S_{14}$ and $S_{16}$–$S_{21}$ are as follows:

The stationary skid $S_1$ is used for checking the coil number and measuring the outer diameter and width of the coil. In stationary skid $S_2$, paper corner protectors are applied to the shoulders of the coil. The next stationary skid, skid $S_3$, is provided for the purpose of adjusting the pitch (distance) between the adjacent steps; skid $S_3$ constitutes an temporary depot. At stationary skid $S_4$, inner peripheral paper is inserted into the interior of the coil W. At stationary skid $S_5$, the coil W is wrapped in an outer peripheral paper having a size corresponding to the size of the coil W.

The next stationary skid, skid $S_6$, like skid $S_3$, is provided for the purpose of pitch adjustment; the skid $S_6$ is an temporary depot. At stationary skid $S_7$, the edge portion of the outer peripheral paper extending off the coil W is folded so as to be squeezed into the interior of the coil. Stationary skid $S_8$ is provided for attaching an inner ring to the coil. This fixes the paper edge portion squeezed into the coil and prevents the wrapping paper and the interior of the coil from being damaged by tongs which are used by an overhead crane to handle the coil after it has passed through the packing line.

The series of steps from the paper corner protector applying process, performed at the stationary skid $S_2$, to the step of attaching the inner ring for fixing the outer peripheral paper, performed at the stationary skid $S_8$, constitute the process of packing the coil W in wrapping paper, which process can be modified as needed. For example, the inner paper insertion step (stationary skid $S_4$) can be omitted.

The subsequent work steps at stationary skids $S_9$ to $S_{11}$ are only applicable to products to be exported. In these steps, the coils wrapped in paper are further wrapped in sheets of iron. At stationary skid $S_9$, top and bottom plates are inserted into the end surfaces of the coil. At stationary skids $S_{10}$ and $S_{11}$, the iron sheet wrapping process is performed, in which a steel sheet is applied to the outer peripheral surface of the coil. For products which are not to be exported, stationary skids $S_9$ through $S_{11}$ can be omitted.

At stationary skid $S_{12}$, the outer periphery of the coil, which has been wrapped in paper (or further wrapped in steel sheets), is tied at both ends by means of straps.

At the next stage, a coil turner T is provided instead of a stationary skid S (there is no stationary skid $S_{13}$). The coil turner T turns the coil W, which has been conveyed from the previous stage, by 90° with respect to the packing line so as to bring the coil axis into alignment with the packing line axis.

Then, at stationary skid $S_{14}$, coil corner protectors are applied to the corners of the inner and outer sections of the coil W, placed in alignment with the packing line axis, and a plurality of eye straps are axially stretched around the inner and outer peripheries of the coil to longitudinally tie the coil.

At the next stage, a coil turner T is provided instead of a stationary skid S (there is no stationary skid 15). The coil turner T turns the coil W, which has been conveyed from the eye strap binding stage, by 90° with respect to the packing line so as to orient the coil axis perpendicular to the packing line axis.

Then, at stationary skid $S_{16}$, hooping is effected to bind a central body strap on the coil body, which has been axially tied by a plurality of eye straps.

At stationary skid $S_{17}$, a predetermined label is affixed to the coil, which has been wrapped in the central body strap. At the next stationary skid, skid $S_{18}$, a QA belt is attached to the wrapped and labeled coil, which belt protects the coil from damage when a plurality of wrapped coils are piled one upon the other. At stationary skid $S_{19}$, the completely wrapped coil is inspected, and stationary skids $S_{20}$ and $S_{21}$ constitute coil hoisting (loading) positions, where the wrapped coil is hoisted by a crane. A plurality of such coil hoisting positions may be provided, as needed, along the coil packing line, in which case additional corresponding stationary skids S may be provided.

At each work station in the above-described coil packing line, a dedicated apparatus (not shown) for carrying out the appropriate operation is provided.

Arranged on the floor is a conveyance means for successively conveying coils from the upstream to the downstream stages, a description of which follows.

A track 1 extends through all the stages from the start to the end where stationary skids S are provided. A reciprocating carriage 2 (hereinafter referred to simply as "carriage") having a hoisting and lowering mechanism is provided between each two adjacent stationary skids S.

Each carriage 2, which is capable of traveling independently, receives a coil W from the stationary skid S on the upstream side and transfers it to the stationary skid on the downstream side.

FIGS. 3 through 6 show an example of the reciprocating carriage 2 having a hoisting and lowering mechanism. Carriage 2 comprises: four track wheels 3, 4 rolling on the track 1, one of the four track wheels 3, 4 being a driving wheel 4; a motor 6 having a speed reduction gear 5, which motor 6 is connected to the driving wheel 4 through a series of gears (not shown) of the speed reduction gear 5; a V-shaped support 7 capable of supporting coils W of different sizes; and a hoisting and lowering device 8 for hoisting and lowering the support 7.

Figure 5:
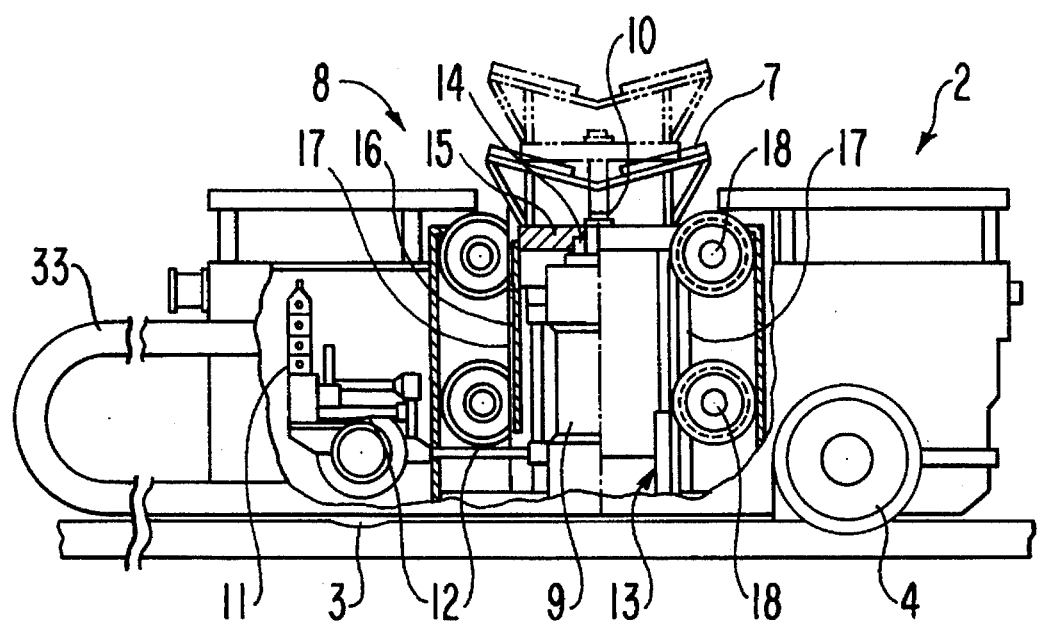
FIG. 5 is a partial sectional view of the reciprocating carriage and track of FIG. 3, showing in detail the hoisting and lowering mechanism mounted.

As shown in FIG. 5, the hoisting and lowering device 8 comprises: a hoisting/lowering power mechanism including a hydraulic cylinder 9 arranged upright at the center of the frame of the carriage 2, and a hoisting/lowering control hydraulic valve stand 11 for controlling the hoisting and lowering operations of the hydraulic cylinder 9; and a guide mechanism 13 for guiding the hoisting and lowering of the hydraulic cylinder 9 so as to enable it to perform vertical hoisting and lowering movements in a stable manner. The guide mechanism 13 comprises: a hoisting/lowering plate 15 to which the V-shaped support 7 is attached and which is screwed to rod 10 of the hydraulic cylinder 9 through a spherical bushing 14; a cylindrical body 16 integrally fastened to the hoisting/lowering plate 15 and extending downwardly in such a way as to cover the hydraulic cylinder 9; two guide rails 17 fastened to the outer surface of the cylindrical body 16 in such a way as to extend vertically; and upper and lower pairs of hoisting/lowering guide rollers 18 which are rotatably supported by the carriage 2 and which hold the guide rails 17 between them.

Figure 6:
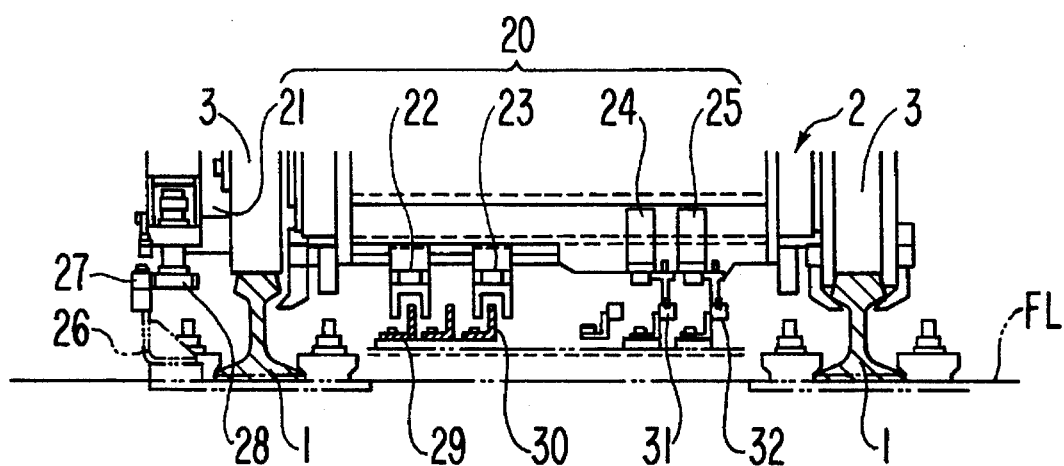
FIG. 6 is a detailed view of the lower section of the carriage and track of FIG. 3.

As shown in FIG. 6, a traveling position control means 20 is provided in the lower section of the reciprocating carriage 2 having a hoisting and lowering mechanism. In this embodiment, the traveling position control means 20 comprises: a traveling position detecting device 21; a home position checking photoelectric switch 22; a fixed position checking photoelectric switch 23; a carriage retreat emergency limit switch 24; and a carriage advance emergency limit switch 25.

The traveling position detecting device 21 is attached to the bottom of carriage 2. The traveling position detecting device 21 detects the distance traveled from the home position and thereby the position of the carriage 2. To do this, the traveling position detecting device 21 determines the number of revolutions of a rolling pinion 28 which is in mesh with a traveling position detecting device driving rack 27, which is secured to the floor through a bracket 26 in such a way as to be parallel with the track 1.

The home position checking photoelectric switch 22 and the fixed position checking photoelectric switch 23, which are both of the transmission type, extend downwardly from the bottom (floor) of the carriage. A home position detecting plate 29 having a light transmission hole and a fixed position detecting plate 30 also having a light transmission hole are respectively arranged at a predetermined home position and a predetermined fixed position on the floor so as to correspond with the photoelectric switches 22 and 23, respectively.

The carriage retreat emergency limit switch 24 and the carriage advance emergency limit switch 25 also extend downwardly from the floor of the carriage 2, and, in correspondence with these limit switches, a retreat limit setting member 31 and an advance limit setting member 32 are arranged at predetermined positions on the floor.

Figure 4:
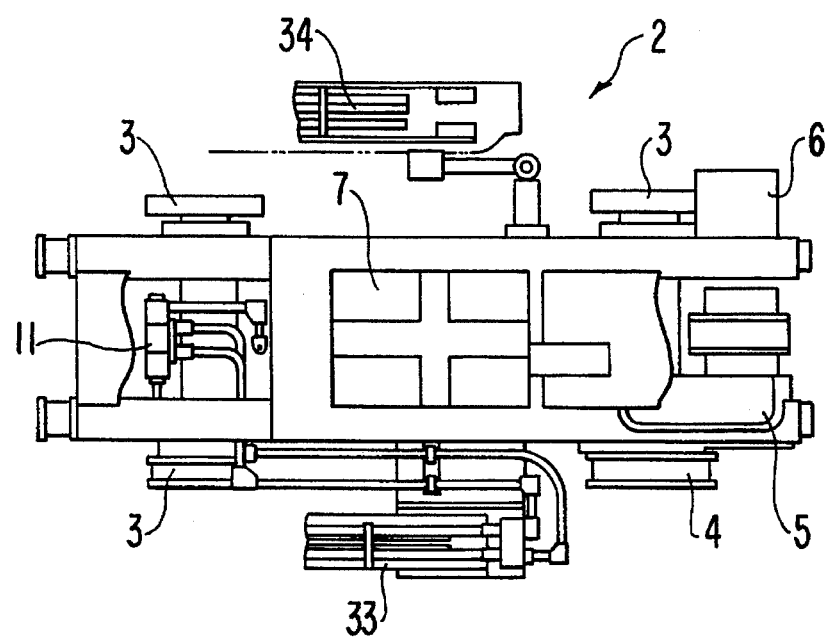
FIG. 4 is a plan view of the reciprocating carriage of FIG. 3.

As shown in FIG. 4, provided on the right and left side surfaces of carriage 2 are a hydraulic side cable bearer 33 connected to the hoisting/lowering device 8, and a conductor side cable bearer 34 connected to the electric equipment, such as the carriage driving motor 6, the hoisting/lowering control hydraulic valve stand 11, and the traveling position control means 20.

Figure 7:
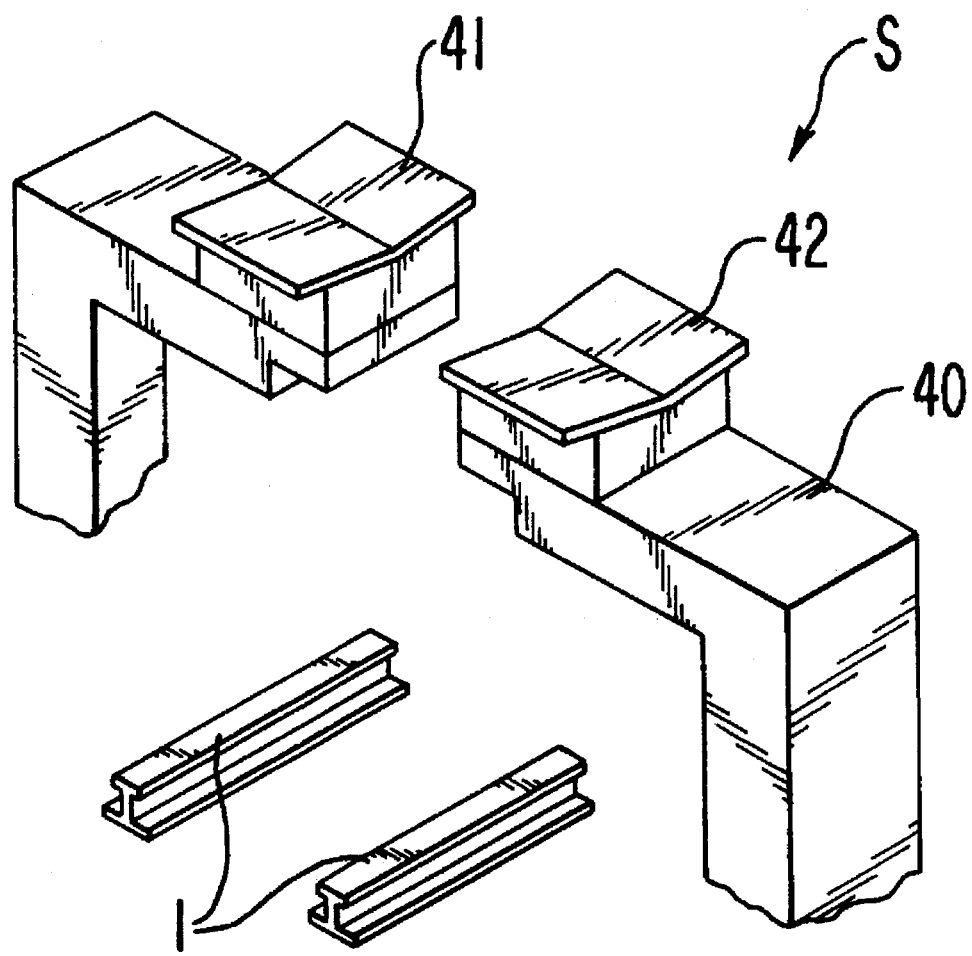
FIG. 7 is a perspective view of the track and essential elements of a stationary skid used in the line of FIG. 1.
Figure 8:
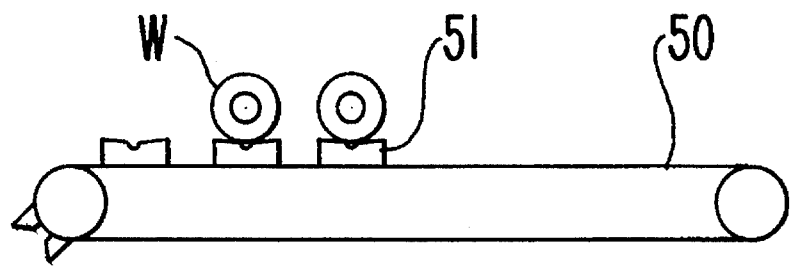
FIG. 8 is a schematic diagram showing a conventional chain conveyor type coil packing line.
Figure 9:
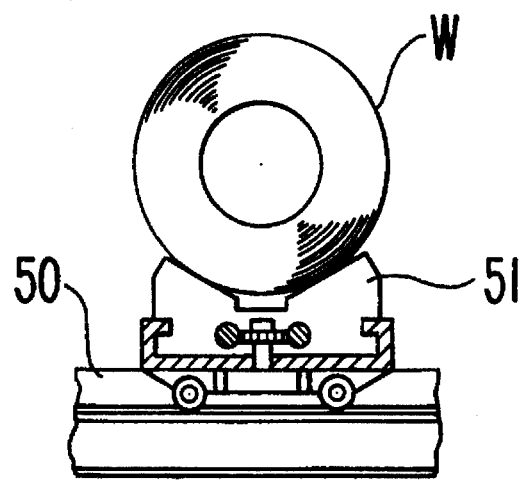
FIG. 9 is an enlarged partial sectional side view of FIG. 8.

As shown in FIG. 7, each stationary skid S has a pair of V-shaped supports 41 and 42, attached to respective sides of a gate-shaped base 40 which stands astride track 1. The distance between the two supports 41 and 42 is somewhat larger than the width of the V-shaped support 7 on the reciprocating carriage 2 having a hoisting and lowering mechanism, so that movement of carriage 2 along track 1 is not hindered.

In correspondence with the above construction, the lower limit to which the V-shaped support 7 on the carriage 2 can be lowered by the hoisting/lowering mechanism 20 is set somewhat lower than the level of the supports 41 and 42 of the stationary skid S. At the same time, the hoisting limit of the V-shaped support 7 on the carriage 2 is set somewhat higher than the height of supports 41 and 42 of the stationary skid S, so that the delivery of coils between the carriage 2 and the stationary skid S can be performed smoothly.

Next, the operation of this carriage will be described.

Suppose a coil W placed on a stationary skid $S_n$ is to be conveyed to the adjacent downstream-side stationary skid $S_{n+1}$. The V-shaped support 7 of the reciprocating carriage 2 is lowered to the lowering limit by the hoisting/lowering device 8 to set it at a level slightly lower than the level of the supports 41 and 42 of the stationary skids S. First, the carriage 2, which is positioned between the stationary skids S, is caused to travel in the reverse direction toward the upstream-side skid. This can be effected, for example, by reverse rotation of the carriage driving motor 6.

After stopping the carriage 2 at a position directly below the stationary skid $S_n$, the hoisting/lowering device 8 is operated to raise the V-shaped support 7. During its ascent, the V-shaped support 7 receives the coil W placed on the supports 41 and 42 of the stationary skid $S_n$, and continues to ascend until it reaches the hoisting limit, at which point it stops. Then, the carriage 2 is caused to travel downstream by the normal rotation of the carriage driving motor 6 to convey the coil W that it has received. Then, the carriage 2 is stopped at a position directly below and between the right and left portions of stationary skid $S_{n+1}$, and the V-shaped support 7 is lowered by operating the hoisting/lowering device 8. During the descent of the V-shaped support 7, the coil W which has been placed thereon is transferred to the supports 41 and 42 of the stationary skid $S_{n+1}$. The V-shaped support 7 continues lowering until it reaches the lower limit, at which point it stops. In this way, the carriage can repeatedly convey the coils as it reciprocates between the two stationary skids $S_n$ and $S_{n+1}$.

The stop positions at each stationary skid S for the reciprocating carriage 2 with a hoisting/descending mechanism are accurately controlled by means of the fixed position detecting plate 30 provided at the stop position and the fixed position checking photoelectric switch 23, which detects the fixed detecting plate 30.

In this embodiment, a stationary skid S is provided at each work station, and a reciprocating carriage 2 is arranged between each two adjacent stationary skids S. The above-described coil conveying operation between each two adjacent stationary skids S is conducted independently by the carriage arranged therebetween. The carriage receives a coil from the upstream stationary skid S and transfers it to the downstream stationary skid S. Thus, predetermined packing operations can be performed successively and smoothly by manual operations or by automatic packing machines installed along the line.

The cycle time for each packing process is not fixed. It varies depending on the outer diameter and width of the coil, the packing specifications, etc. In this embodiment, it is possible to transfer a coil which is ready for conveyance from one stage to the next stage without having to wait for the completion of the operations at each stage. This is advantageous for a packing line which includes a work station requiring a relatively long operating cycle time. The closing-ahead and closing-back function thus obtained helps to eliminate waste of operation time.

The present invention includes the following advantages.

Due to the use of the reciprocating carriage 2 with a hoisting and lowering mechanism, there is no need to dig a deep hole in the floor to provide a return passage. The depth of the packing line foundation may be relatively shallow. In the conventional chain-conveyor type packing line, the depth of the foundation was approximately 3 m, whereas, in the present invention, the depth is approximately 1 m. Thus, the required depth has been reduced to one-third of that previously required. Further, because there is no return passage beneath the surface of the floor, maintenance is possible from above the floor. Therefore, there is no need to provide a passage for maintenance in the foundation. Thus, the width of the foundation can be reduced from the conventional width of approximately 3 m to approximately 1.6 m.

As a result, the cross-sectional area of the foundation can be reduced from 9 m$^2$ to 2 m$^2$, whereby it is possible to save space and reduce construction time, thereby achieving a substantial reduction in construction cost.

Further, the present invention provides a great advantage over the conventional carriage-type system in that the space and cost for the return passage can be eliminated, and, further, the number of carriages can be reduced.

Furthermore, the traveling distance for the carriage between each two adjacent stages can be freely set in accordance with the optimum distance between the stages. It is thereby possible to minimize the entire length of the coil packing line, thereby reducing the construction cost of the packing line due to reduced costs in housing the packing line, wiring, piping, etc.

Further, as stated above, in this embodiment, it is not necessary to perform the packing operations at all the stages in unison. That is, the conveyance of coils can be conducted independently for each process; upon completion of the process at one stage, the coil is transferred to the next stage. In this manner, there is no need to wait for the completion of the operations at all stages before conveying. This is especially advantageous in a packing line having a stage requiring an operating time which is significantly longer than the operating time of other stages. Thus, the rate of operation of the expensive automatic packing machines can be improved.

Moreover, if the operator interrupts the operation of the packing process of which he is in charge, for example, to supply a particular packing material to the automatic packing machine, it is possible for the other processes to continue without interruption. Thus, the operators of the line are released from the mental pressure experienced in the conventional conveyor line, in which it is necessary to stop the entire line each time such an interruption occurs. Therefore, an ergonomically designed working environment can be realized.

In addition, because the stop position for each carriage (at the appropriate stationary skid) is set independently, the stop position is free from mutual interference between the carriages. Therefore, it is possible to perform easier and more accurate positional control on the conveying apparatus.

In the coil packing line of the present invention, which uses carriages with a hoisting and lowering mechanism, it is also possible to provide a group of carriages linked together at a fixed pitch (distance from one another) in a section of the packing line where a fixed pitch conveyance can be performed without any problem. In this case, the group of carriages may be caused to travel by a single traveling device.

The hoisting and lowering device for the support mounted on the carriage of this invention is not restricted to a hydraulic device. It may also be an electric hoisting/lowering device, etc.

Further, the traveling position control means is not restricted to that of the above-described embodiment. It is also possible to use other types of well-known position control devices.

Although the invention has been described in its preferred form with a certain degree of particularity, it should be understood that the invention may be changed in the details of construction and equivalents of the combination and arrangement of parts may be used without departing from the spirit and scope of the appended claims.

What is claimed is:

1. A coil packing line in which coils are packed by a plurality of operation processes, comprising:

a plurality of work stations, each operation process having a corresponding work station;

stationary skid means provided at each work station for supporting a coil at the work station;

carriage means provided between each work station for removing a coil from an upstream stationary skid means, supporting the coil and depositing the coil at a downstream stationary skid means; and a plurality of reciprocating means for independently moving at least one carriage means back and forth between the upstream and downstream stationary skid means.

2. The coil packing line of claim 1, further comprising at least one resting station provided among the work stations, stationary skid means being provided at each resting station.

3. The coil packing line of claim 1, further comprising at least one coil turner, carriage means being provided for depositing a coil at the coil turner and removing a coil from the coil turner.

4. The coil packing line of claim 1, wherein:

the stationary skid means have right and left supports positioned with a space therebetween, the right and left supports together supporting the coil at a working height; and the carriage means comprises:

a plate for supporting the coil, the plate having a width less than the width of the space between the right and left supports of the stationary skid means; and a means for selectively raising and lowering the plate so that the plate can move between a positions vertically above and vertically below the working height.

5. The coil packing line of claim 1, wherein the reciprocating means has traveling position control means for automatically controlling the position of the carriage means.

* * * * *